(12) United States Patent
Zhu et al.

(10) Patent No.: US 6,792,436 B1
(45) Date of Patent: Sep. 14, 2004

(54) METHOD FOR SYNCHRONIZING MULTIPLE SOFTWARE CACHES IN A MEMORY

(75) Inventors: Rene Zhu, Castro Valley, CA (US); Randy Dale Picolet, Union City, CA (US); Vivek P. Singhal, Sunnyvale, CA (US)

(73) Assignee: Persistence Software, Inc., San Mateo, CA (US)

( * ) Notice: Subject to any disclaimer, the term of this patent is extended or adjusted under 35 U.S.C. 154(b) by 207 days.

(21) Appl. No.: 09/781,910

(22) Filed: Feb. 9, 2001

Related U.S. Application Data

(60) Provisional application No. 60/181,664, filed on Feb. 11, 2000.

(51) Int. Cl.[7] ............................................... G06F 17/30
(52) U.S. Cl. ....................................... 707/203; 707/201
(58) Field of Search ............................. 707/203, 10, 8, 707/201; 709/216, 101, 201; 711/141, 18

(56) References Cited

U.S. PATENT DOCUMENTS

| | | | |
|---|---|---|---|
| 4,432,057 A | * | 2/1984 | Daniell et al. ................. 707/8 |
| 5,499,371 A | | 3/1996 | Henninger et al. |
| 5,615,362 A | | 3/1997 | Jensen et al. |
| 5,706,506 A | | 1/1998 | Jensen et al. |
| 5,734,898 A | * | 3/1998 | He .............................. 707/203 |
| 5,893,140 A | * | 4/1999 | Vahalia et al. ............... 711/118 |
| 5,897,634 A | * | 4/1999 | Attaluri et al. ................. 707/8 |
| 6,078,926 A | | 6/2000 | Jensen et al. |
| 6,119,151 A | * | 9/2000 | Cantrell et al. ............. 709/216 |
| 6,256,712 B1 | * | 7/2001 | Challenger et al. ......... 711/141 |
| 6,286,004 B1 | * | 9/2001 | Yoshiura et al. .............. 707/10 |
| 6,564,218 B1 | * | 5/2003 | Roth ........................... 707/10 |

\* cited by examiner

*Primary Examiner*—Jean M. Corrielus
*Assistant Examiner*—Gwen Liang
(74) *Attorney, Agent, or Firm*—Thelen Reid & Priest LLP

(57) ABSTRACT

A distributed cache management system controls individual cache objects so they are selectively updated if messages are received at another cache in an expected order and selectively invalidated if messages are received with certain error state, thus causing reference to be made to the central database. In specific embodiments of the invention, each change to an object in the central database is assigned a unique version number with an inherent ordering to serialize all changes, and the version number is used as a key to determine if messages have been lost or otherwise received at a cache out of order. In a further specific embodiment, full object state information is communicated among caches without need for verification through the central database. Thus if messages are lost or received out of order, the state can be applied to the targeted objects in the local cache assuring full synchronization.

65 Claims, 4 Drawing Sheets

METHOD FOR SYNCHRONIZING MULTIPLE SOFTWARE CACHES IN A MEMORY

CROSS-REFERENCES TO RELATED APPLICATIONS

This application claims priority from the following patent application, the disclosure of which is incorporated by reference: "METHOD FOR SYNCHRONIZING MULTIPLE SOFTWARE CACHES IN A MEMORY," application Ser. No. 60/181,664 filed Feb. 11, 2000.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to systems for managing distributed information included in a database and caches and provides techniques for improving efficiency of use of records which may be replicated. In particular an exemplary embodiment provides a method for synchronizing caches.

As background, reference is made to U.S. Pat. No. 5,615,362 issued Mar. 25, 1997 and related U.S. Pat. No. 5,706,506 issued Jan. 6, 1998 for: METHOD AND APPARATUS FOR MANAGING RELATIONAL DATA IN AN OBJECT CACHE, the content of which is incorporated by reference and made a part hereof.

In any database management system there are three substantive operations that affect the content of the database: create a record, update or modify a record, or delete a record. Proper execution of these operations helps to ensure that records in a database are current and correct. It is important that all copies of a record have correct information or will access the correct information upon the execution of a transaction. Hence, control of content is essential for data integrity, where multiple copies of the data record exist, such as in a computing network having a mass storage/central database and small, readily accessible caches. A cache is used to store data that is frequently used or is about to be used. Use of a cache reduces the number of times mass storage needs to be accessed and often provides faster access times than a central database. Hence, cache use can speed up access to database records.

As computing networks have become larger and more complex so have database management systems that control the flow of data across computing networks. Examples of such increasingly complex computing networks include, local area network, wide area networks, and the Internet. The implementation of multiple cache across such networks is now prevalent and is essential to ensure fast and accurate access to data. For example, Internet businesses may require the placement of multiple servers worldwide with each server possessing a cache. Use of multiple servers each having a cache provides faster and lower cost access to data for local Internet users, as a central database may be a world away. To allow users to exploit the advantages of local servers and local cache placement, database management systems should rapidly synchronize (shared and changed) data across such computing networks having multiple cache coupled to a central database.

Moreover, the maintenance of data integrity across a distribution of cache and a central database is desirous, as each cache may need to be synchronized with every other cache as well as be synchronized with a central database. Maintaining data integrity is complicated by multiple caches that independently receive synchronization requests from multiple caches. To this end, prioritizing and coordinating independently received commands between various caches and a central database is essential.

In known systems, cached data such as in the form of data objects retained integrity by requiring that the state of the object be frozen or locked while the data object was being used. Each transaction with a data object had to be cleared through a gatekeeper for the central database, and all updates required that the complete object be defined before a lock was removed. Thus only a limited number of users, often only one, could access a data object that was being used.

In an attempt to retain the ability to develop alternatives to locking, systems are known for manipulating portions of the data objects and communicating those portions of the objects that were changed to the central database. For example, in a data object having, employee name: Mary Jones, department ID: software development, and employee status: junior engineer, if employee status is changed from junior engineer to senior engineer, only changes to employee status would be communicated. Further, because only portions of the data objects were changed, updates to the central database had to occur in the order of the occurrence of the changes rather than in the order in which the report of changes occurred. Since order of receipt could not be controlled, there would be a resulting delay, and the processing required was complex to assure guaranteed delivery and proper ordering. Moreover, updates to various cache in a network of cache, also had to occur in the order of the occurrence of changes rather than in the order the report of changes occurred. Due to this requirement known systems are intolerant of loss of objects. As such, objects received out of order of occurrence of changes were accumulated until the accumulated objects were representative of the order of occurrence of changes. Only upon accumulation of objects representative of the order of occurrence of changes were objects committed to cache. Intolerant of losing synchronization messages (i.e., synchronization requests), known systems further required the accumulation of objects be in relatively slow hard memory (such as a magnetic memory storage devices), rather than in faster soft memory (such as a memory chip). Thus such known systems maintained a large overhead in the storage of data objects received out of order of occurrence of changes; the cost of which was relatively slow synchronization between caches.

What is needed is an information management system that does not have locked or frozen objects and can make updates regardless of the order in which reports are received. Moreover, an information management system is needed that synchronizes the full object state of data objects and thus is not tied to the use of relatively slow hard storage to guarantee synchronization of portions of data objects. The, system also needs to be faster, more efficient and tolerant of loss of data.

SUMMARY OF THE INVENTION

According to the invention, in an information management system operative on a plurality of networked computer systems having a central database providing storage of the latest confirmed version of data objects and a plurality of caches which can communicate with multiple clients, wherein the central database need not be locked, i.e., allowing concurrent access and changes, the information management system stores and provides state information for each data object in the central database, and a distributed cache management system controls individual cache objects (objects which have been retrieved from or inserted into the central database and locally cached) so they are selectively changed if messages are received at another cache in an expected order and selectively invalidated if messages are received at another cache with certain states indicative of error, i.e., if the objects are recognized as other than the confirmed latest version based on an "optimistic" control attribute and data in a cache synchronization decision table, thus causing reference to be made to the central database. In specific embodiments of the invention, each change to an object in the central database is assigned a unique version number with an inherent ordering known as its optimistic control attribute to serialize all changes, and the optimistic control attribute is used as a key to determine if messages have been lost or otherwise received at a cache out of order. Thus the optimistic control attribute serves as the local object clock under which changes in objects are reported to the central database so that decisions can be made at a local cache to process synchronization messages without unnecessary reference to the central database. In a further specific embodiment, full object state information is communicated among caches without need for verification through the central database. Thus if messages are lost or received out of order, the state can be applied to the targeted objects in the local cache assuring full synchronization.

As a result of the invention, individual caches can be informed of changes without having to constantly query the central database.

The invention will be better understood by reference to the following detailed description in connection with the accompanying drawings.

DESCRIPTION OF THE SPECIFIC EMBODIMENTS

Following is a description of a specific embodiment of a method of the present invention. Section 1 provides descriptions of digital computing networks that can be used to support the steps for the method. Section 2 provides a general description of synchronization requests. Section 3 provides a description of an embodiment of the method of the present invention for cache synchronization. Section 4 concludes the description. Appendices 1 and 2 attached hereto include copyrighted computer code.

1. System Overview

Figure 1:
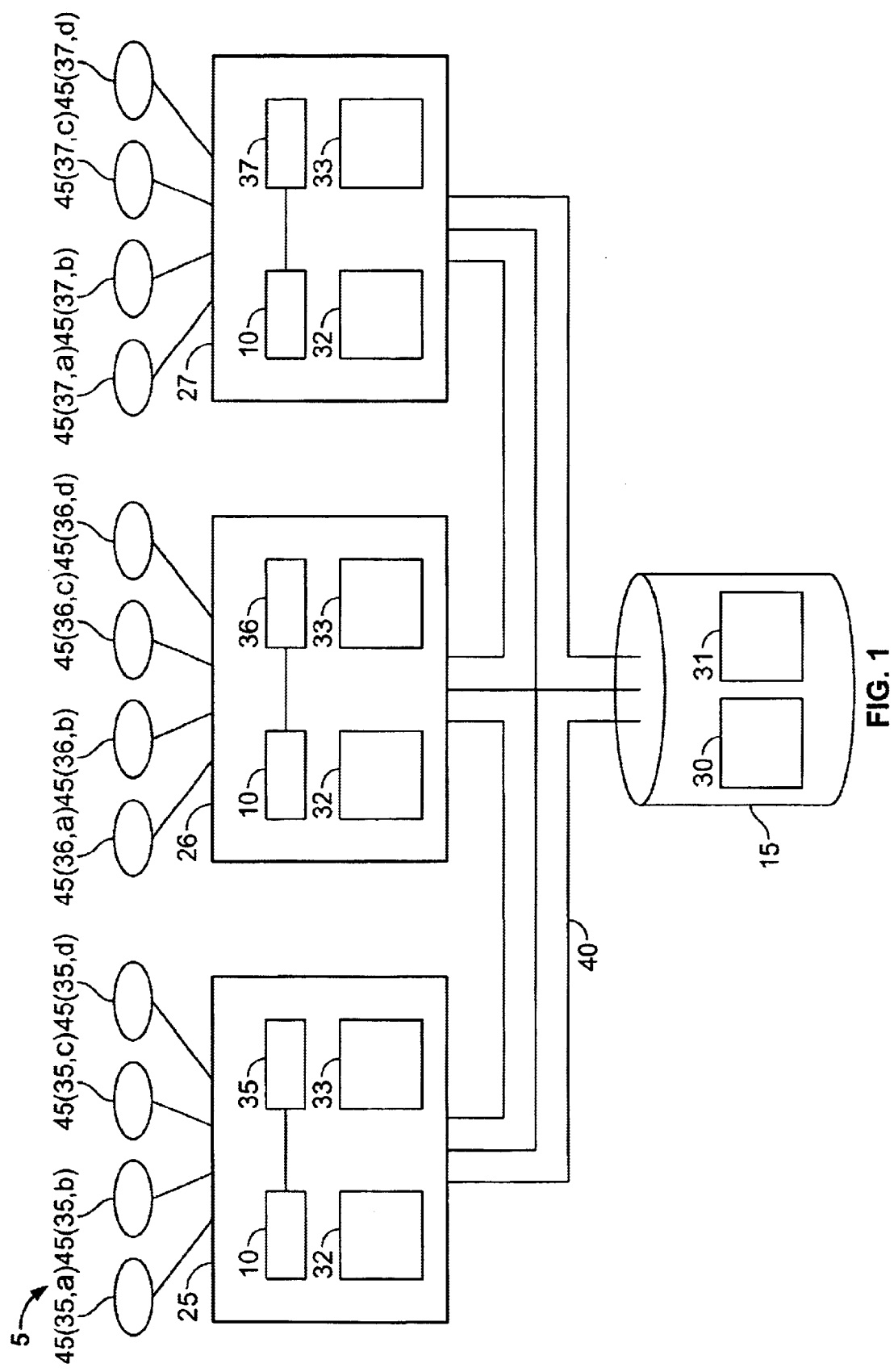
FIG. 1 is a block diagram of an information management system according to the invention with peer caches.

FIG. 1 is a block diagram of an example of a digital computing network 5 suitable to implement the method of the present invention in a typical embodiment. The digital computing network comprises computing hardware and related system software that together support the execution of method software 10 that carries out the steps of the method of the present invention. More particularly, the system of FIG. 1 comprises a central database 15 and a plurality networked computer systems 25, 26 and 27. The central database has at least one associated processor 30 and associated memory 31. Moreover, each networked computer system 25, 26, 27 has at least one processor 32 and memory 33, wherein a plurality of distributed cache management systems (DCMSs) 35, 36 and 37 are operative on the plurality of networked computer systems. In particular, each networked computer system contains portions of a copy of associated DCMSs 35, 36 and 37 such that each portion is operative on its associated networked computer system. Each networked computer system also contains portions of method software 10, such that each portion of the method software is operative on its associated networked computer systems. Each DCMS implements the methods of the present invention for synchronizing cache objects among the cache of the DCMSs. The plurality of DCMSs operative on the plurality of networked computer systems use the memory of the networked computers for transactional and shared cache purposes (referred to collectively as cache). Generally, objects in shared caches are available to all clients. However, to protect data integrity, transactional caches isolate changes to cache objects until the changes are committed to the shared caches.

In accord with the execution of method software 10, each DCMS may independently communicate messages to and receive messages from every other DCMS and the central database across a communication network 40. Further each DCMS can communicate with multiple clients 45 that use the networked computers as servers or for other access or hosting purposes. Each client is shown with suffixed reference numerals and letters, with a first suffix (35, 36, 37, ...) designating the DCMS to which the client may be in communication and a second suffix (a, b, c, d, ...) designating the individual client. Clients may issue commands to the DCMSs in accord with the methods of the invention.

By way of example, FIG. 1 shows three multifunction computer server systems 25, 26, 27 networked together, but more or fewer such computer systems may be networked in accord with the method of the present invention. Moreover, by way of example, four clients 45(.,.) are shown to be in communication with each DCMS 35, 36, 37 in the computer systems 25, 26, 27, but more or fewer clients may be in communication with each DCMS in accord with the methods of the present invention.

Although the method of the present invention operative on the plurality of networked computer systems is generally referred to as method software, the methods of the present invention may be implemented in software, firmware or a combination of software and firmware.

The DCMSs 35, 36, 37 shown in FIG. 1 have a peer cache structure; that is, only one DCMS separates a client 45(.,.) from the central database 15. Similarly described, only one layer of DCMSs 45(.,.) is coupled between clients and the central database 15. It will be appreciated by those of skill in the art that a wide range of digital computing network configurations can be used to support the method of the present invention including for example, networks having DCMSs with caches in a hierarchical structure.

Figure 2:
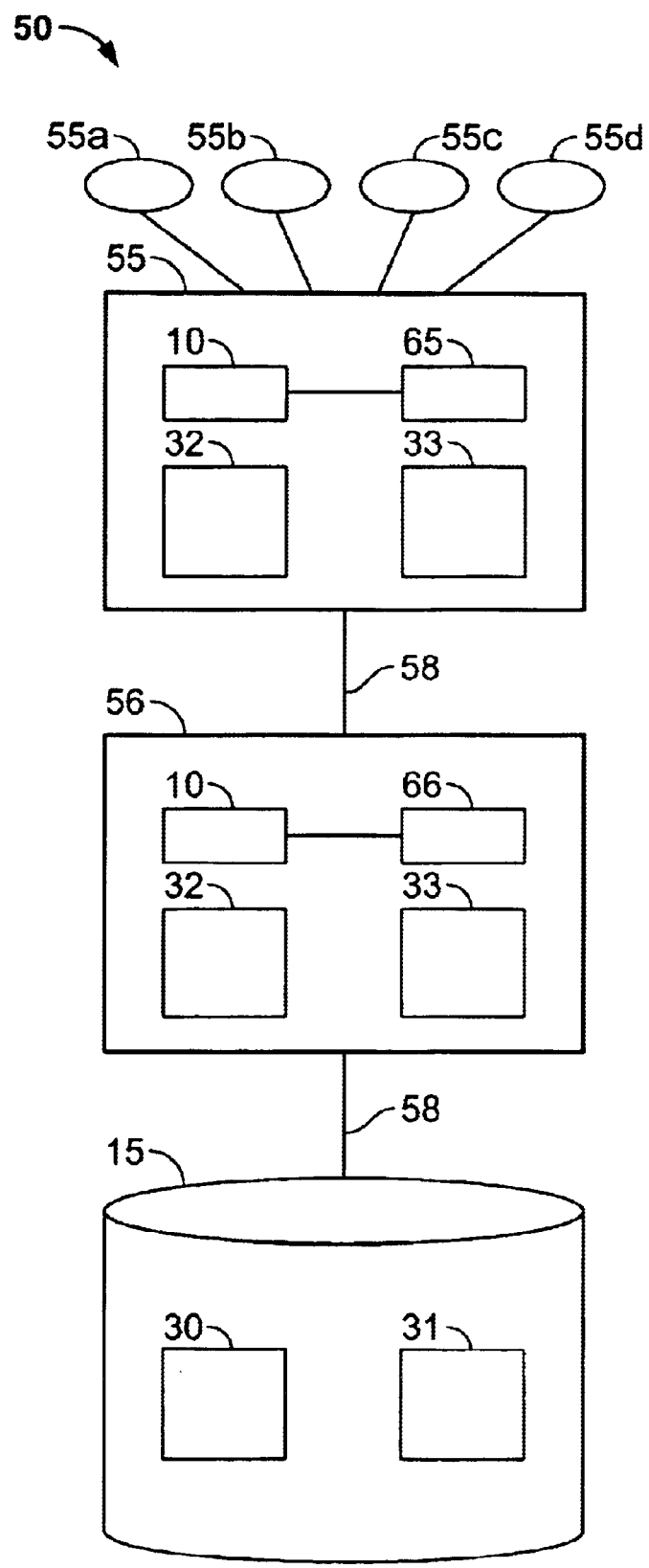
FIG. 2 is a block diagram of an information management system according to the invention with hierarchical caches.

FIG. 2 is a block diagram of an example of a typical embodiment of a digital computing network 50 suitable to implement the hierarchical method of the present invention. The digital computing network comprises computing hardware and related system software that together support the execution of the method software 10 that carries out the steps of the method of the present invention. Portions of method software 10 are resident in various components of the network. More particularly, the system of FIG. 2 comprises a central database 15 and a plurality networked computer systems 55 and 56, wherein computer system 55 is at the top of a hierarchy and computer system 56 is at the bottom of the hierarchy. The central database and plurality of networked computer systems communicate across communication network 58. The central database has at least one associated processor 30 and associated memory 31. Moreover, each networked computer has at least one processor 32 and memory 33. DCMSs 65 and 66 are operative on the networked computer systems in which they are contained. Moreover, the DCMSs and their associated caches have a hierarchical structure similar to the networked computer systems in which the DCMSs are contained and operative upon.

In a hierarchical structure of DCMSs, clients 55(a), 55(b), 55(c) and 55(d) may issue commands to and receive information directly from DCMS at the top of the hierarchy. By way of example, FIG. 2 shows four clients in communication with DCMS 65, but more or fewer clients may be in communication with the DCMS in accord with the methods of the present invention. A DCMS at the top of a hierarchy may either 1) not directly communicate with the central database but communicate directly with a DCMS below it which in turn may directly communicate with the central database, or 2) it may communicate directly with the central database. DCMS 66 at the bottom of the hierarchy is not in direct communication with clients. The digital computing network 50 as illustrated by way of example in FIG. 2 has two layers of DCMSs in the hierarchy, but more layers of DCMSs may be disposed between the top and bottom DCMSs to implement the method of the present invention.

Each networked computer system also contains portions of method software 10, operative with the associated DCMS to implement the methods of the present invention for synchronizing cache objects (i.e., data objects from a central database and locally cached) in the cache of each DCMS. The plurality of DCMSs operative on the plurality of networked computer systems use the memory of the networked computer systems for transactional and shared cache purposes (referred to collectively as cache) and is similar in overall function to the previously described peer configuration (FIG. 1). Generally, objects in the shared cache are available to all clients. However, to protect data integrity, the transactional cache isolate changes to objects until the changes are committed to the shared cache.

The central database of the above described digital computing networks, (peer or hierarchical cache structured networks) can be of many forms, including generally, structured databases and including, more specifically, relational databases, both comprising software and associated data. A structured database comprises tables, each table consisting of a set of rows, each row being delimited into a set of columns. An example of a structured database is a relational database containing an employee table. The employee table can further contain a set of rows, each row consisting of two data columns: salary and name. As will be evident to those of skill in the art, peer and hierarchical systems may be employed in various combinations.

2. Synchronization Requests

Synchronization requests will be generally described and will be further described in a detailed description of the method of the present invention. Method software 10 implements capabilities for synchronizing, creating, updating, and deleting, cache objects across each cache of a plurality of DCMSs. Synchronization commands, "create", "update" and "delete" are referred to as an object's transactional operation. In particular, method software 10 processes requests from a sender DCMS to synchronize the central database and further to synchronize other/receiver DCMSs, such that the receiver DCMSs do not unnecessarily access the central database for synchronization, but synchronize in accord with the method of the present invention.

For both create and update requests the full object state of the cache object is sent with the request. The full object state of a cache object includes the data associated with all fields in an object. For example, if a cache object has three fields, 1) employee name, 2) department ID, and 3) employee status, and data associated with the fields respectively includes Mary Jones, software development and junior engineer, the three fields with associated data are referred to as the full object state. For delete requests the full object state of the cache object is not sent with the request, but only an optimistic control attribute (described in detail below) and information needed to identify the cache object for subsequent deletion, (the identifier is referred to as the "primary key"). As the full object state of cache objects are not sent with requests to delete cache objects, delete transactions are generally executed faster than create and update transactions.

3. Method Overview

Figure 3:
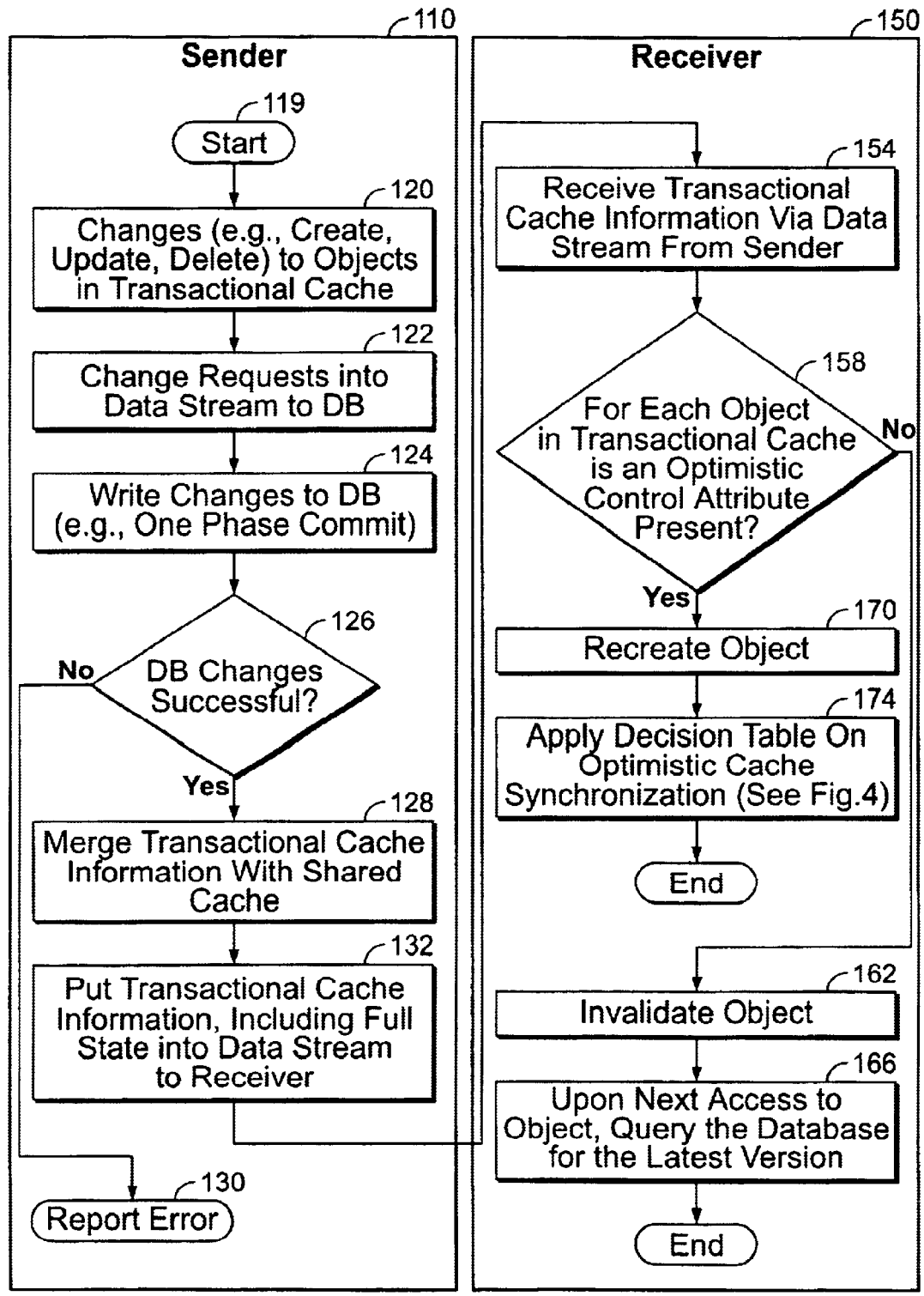
FIG. 3 illustrates a simplified embodiment of a cache synchronization method between a sender server and a receiver server of the present invention.
Figure 4:
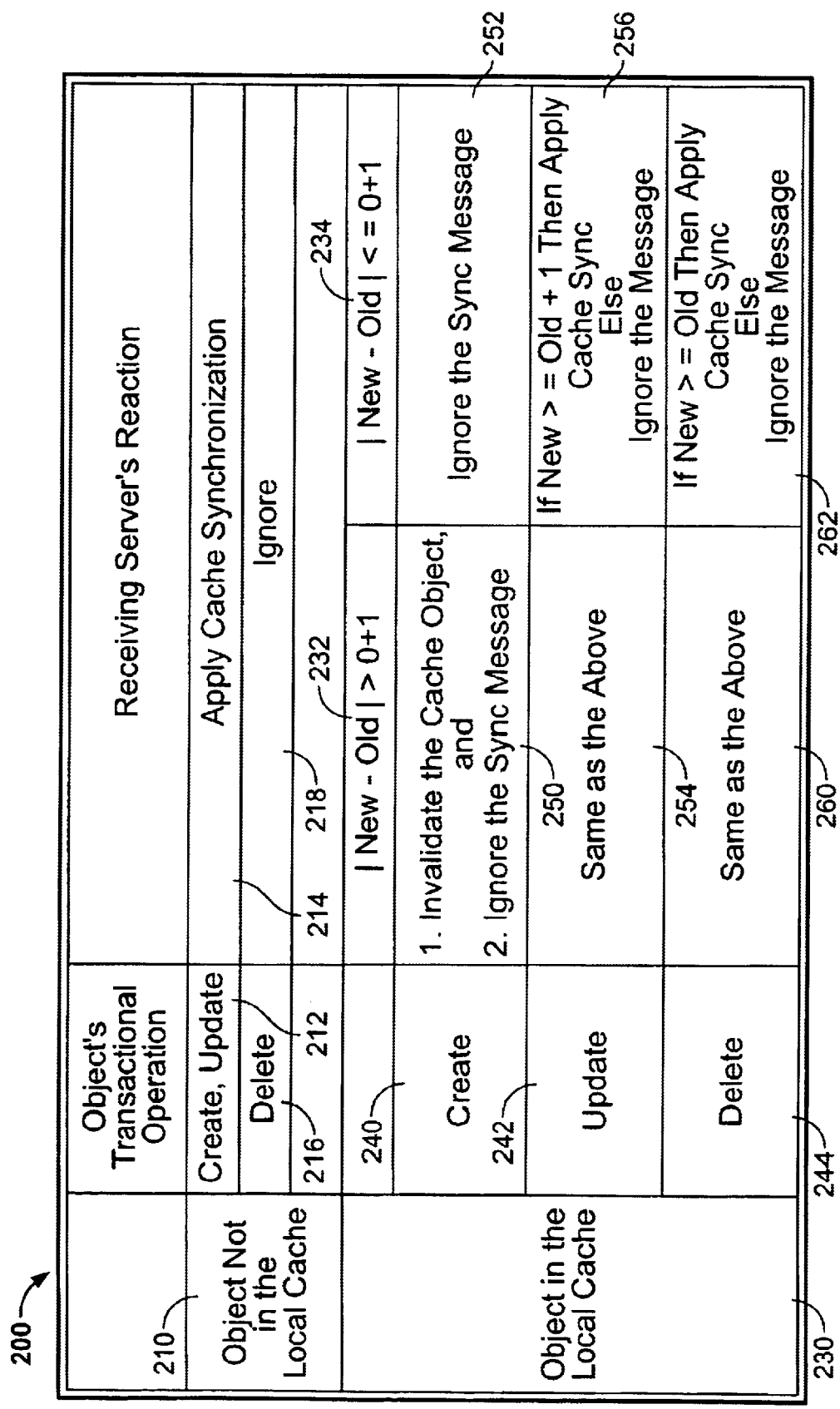
FIG. 4 shows one specific embodiment of an optimistic cache synchronization decision table of the present invention.

The flow chart of FIG. 3 in combination with the cache synchronization decision table of FIG. 4 illustrates the operation of the generalized method of the invention. Illustrated in FIG. 3 is a simplified embodiment of the present invention of a cache synchronization method and system between a sender DCMS, a central database and a receiver DCMS. In this embodiment, each DCMS is associated with at least one processor, a memory, and it has a connection to a database.

The sender process 110 starts 119 with a change (for example, an update), to a cache object in the transactional cache of a sender DCMS 120. The sender DCMS in turn requests a change in the central database 122. Each of the synchronization requests, such as create, update and delete, issued by a sender DCMS to the central database will be separately discussed.

First, if a change request 122 is a request by the sender DCMS to "create" an object in the central database, the central database, upon receipt of the request, determines whether the data object already exists in the central database. If the data object is not in the central database, the central database stores/commits the data object 124. If the central database provides for the storage of version identifiers for data objects, then a version identifier will also be stored or written to the database 124. Not all central databases provide for the storage of version identifiers for data objects. Version identifiers are also referred to as optimistic control attributes (OCAs) and are set upon the event of a sender DCMS issuing a synchronization request to the central database. Each change to a data object in the central database is assigned a unique OCA with an inherent ordering to serialize all changes to the data object. Regardless of whether an OCA is used, if the data object is already in the central database, the database will ignore the create request. If the central database fails to create the data object, then an error is reported 130.

Second, if the change request 122 is a request by the sender DCMS to "update" a data object in the central database, the central database, upon receipt of the request, determines whether the data object that has been requested to be updated already exists in the database. If the data object exists in the central database, the data object will be updated, and the data object's OCA will be stored if the central database provides storage for OCAs 124. If the update request fails, then an error is reported 130.

Third, if the change request 122 is a request by the sender DCMS to "delete" a data object in the central database, the central database will delete the data object if present 124. If the central database fails in the delete request an error is reported 130.

If at step 126, the central database write is successful (i.e., the data object is committed to the central database) then confirmation is issued to the sender DCMS. The sender DCMS in turn copies over the changed object to its shared cache (step 128). At step 132, the sender DCMS puts the changed cache object into the data stream via a communications network to a receiver DCMS.

The receiver DCMS process 150, commences with the receiver DCMS receiving the streamed cache object. As will be discussed in detail below, the receiver DCMS will in turn evaluate whether to 1) change/synchronize the cache object in local cache, or 2) ignore the request, or 3) invalidate the cache object. Invalidation requires a receiver DCMS to access the central database upon a next request to access the cache object locally. Each of these decisions is based upon whether the cache object exists in the cache locally and is based upon an OCA if present in the received cache object message and may be further based upon a data accuracy "comfort factor" if appropriate conditions of the local cache and received cache object are satisfied.

The OCA is used as a key to determine if messages have been lost or otherwise received at a cache out of order of the changes to the message. The DCMSs use OCAs as local object clocks (i.e., local version identifiers) so that decisions can be made at a local cache to process synchronization messages (also referred to as synchronization requests) without unnecessary reference to the central database. Thus if messages are lost or received out of order, the full object state of the cache object can be applied to the targeted cache objects in the local cache assuring full synchronization.

For each object in the transactional cache, the steps beginning at 158 are executed. If at step 158, an OCA is determined not to be present, the cache object is invalidated in the shared cache of the receiver DCMS (step 162). At step 166, upon the next request to access the cache object in local cache, the central database is queried for the latest version of the cache object. Thus the possibility of the use of stale cache objects is minimized.

Alternatively, if at step 158, an OCA is determined to be present in the data stream, the cache object is recreated (step 170). More specifically, the recreation will yield either the full object state, (if a create or update request was received), or will yield a primary key for the cache object without the full object state, (if a delete request was received). At step 174, the receiver DCMS applies an optimistic cache synchronization decision table such as shown in FIG. 4 to determine whether to apply the changed cache object to the receiver DCMS's shared cache.

FIG. 4 shows a specific embodiment of an optimistic cache synchronization decision table 200 of the present invention. In the above example the cache object at the receiver DCMS's local cache is either not in the receiver's cache designated by 210 or is in the receiver's cache designated by 230. If the cache object is not present in the receiver DCMS's local cache, only steps 212, 214, 216 and 218 are subsequently available in decision making and action. Steps 212, 214, 216 and 218 are further described below. Alternatively, if the cache object is present in the receiver DCMS's local cache, only steps 232, 234, 240, 242, 244, 250, 252, 254, 256, 260 and 262 are available in subsequent decision making and action. Steps 232, 234, 240, 242, 244, 250, 252, 254, 256, 260 and 262 are further described below. The cache object's transactional operations include: create 212, 240, update 212, 242, or delete 216, 244.

For illustration, it is assumed the cache object is not in the receiver DCMS's cache 210 and a create or update synchronization request is received 212. As the cache object is not already in the receiver DCMS's cache, both the create and update commands will result in the receiver DCMS applying cache synchronization 214. Similarly described, the full object state of the cache object will be transferred to the receiver DCMS's shared cache.

In a different illustrative example, it is assumed the cache object is not in the receiver DCMS's local cache 210 and a delete synchronization request is received 216. As the cache object is not in the receiver DCMS's cache, no action is required and the request is ignored. To speed processing of delete requests, such requests are issued without the full object state of the cache object.

In further illustrative examples to be considered, a version of the cache object is assumed to be in the local cache of the receiver DCMS 230. In these examples, both the OCA and "$\epsilon$" are interrogated and used in an evaluation of how the synchronization requests, namely create 240, update 242 and delete 244, are processed. As previously mentioned, the OCA is an inherent ordering indicator for serializing all changes to data objects. The term "$\epsilon$" is a so called "data accuracy comfort factor." "$\epsilon$" is a user controlled parameter that serves as a comfort/speed adjustment between a user's comfort with possible use of stale cache objects, (objects not of the most recent version) that are quickly accessed in local cache, versus the use of more recent cache object versions that may need to be accessed from the slower central database. In a specific embodiment of the present invention, lower $\epsilon$ values ($\epsilon$ must be a non-negative number) are set when information accuracy is required at the cost of speed, while higher $\epsilon$ values are set when lower information accuracy is acceptable with the benefit of fast access. For example, if $\epsilon=0$, the latest cache object version is required to be used when a client requests access to the cache objects. $\epsilon=0$ carries with it a relatively higher possibility of numerous central database queries and slower cache object access times. "$\epsilon$" also provides a threshold between acceptable and unacceptable synchronization requests for cache objects having OCA sufficiently out of sequence with the local object clocks of cache objects.

The desirability of using a data accuracy comfort factor arises from the possibility of loss of cache object synchronization requests and the possibility of cache object synchronization requests arriving out of order of changes. Test 232 $|new-old| > \epsilon+1$ provides that if a so called "new" cache object version is so different from an "old" cache object version (new and old versions both are numerically represented by an OCA), a user can decide to ignore the synchronization request and invalidate the cache object, 250, 254, 260 by suitably setting $\epsilon$ to a desired value. "New" stands for the OCA value of the cache object in the synchronization request, and "old" stands for the OCA value of the cache object in the local cache. For an illustrative example, it is assumed new=2, and old=6. By suitably setting $\epsilon=1$, synchronization requests, namely create 240, update 242 and delete 244, are ignored (as $|6-2|$ is greater than 1+1 (step 232)), and the cache object is invalidated at respective steps 250, 254, 260. In a further illustrative example it is assumed new=6 and old=2. By suitably setting $\epsilon=1$, the user indicates that even though a cache object having relatively newer information (new=6) than the old cache object, (old=2), the version difference is too big, i.e., $|6-2|$ is greater than 1+1 (test 232), to be accepted by the user. As such, all synchronization requests, create 240, update 242 and delete 244, will result in invalidation of the local cache object at respective steps 250, 254, 260. The motive a user may have in not wanting to use a newer version cache object includes suspicions that cache object version 3, 4 and 5 had become lost or were slow arriving at the receiver DCMS; thus the user may further suspect that versions newer than version 6, such as 7 or 8, may have also been lost or are slow arriving. Thus instead committing a possibly stale cache object version 6 to cache for client use, the user would prefer to force the cache to make a relatively slow query of the central database instead of a faster query of the local cache. Thus users are assured latest cache object versions are available to clients.

Contrary to the last illustrative example, a user may desire new cache object 6 be updated to local cache even though old cache object 2 is four versions older. Test 234, $|new-old| <= \epsilon+1$, in combination with test 256, new>=old+1, provides for such an option. Test 234 is a threshold for test 256. Assuming, new=6, old=2, and $\epsilon=3$. Then $|6-2|$ is less than or equal to 3+1 (test 234). This is an example of an equality. Moreover, 6 is greater than or equal to 2+1 (test 256); thus the cache is updated with the full object state of cache object 6. Due to the use of full object states it can be seen that messages 3, 4, and 5 need not be accumulated in a local hard memory in order to construct the full object state, as is necessary with known prior art systems that manipulate only portions of objects. Thus if messages 3, 4, and 5 are lost or late in arriving at the receiver DCMS, a client will have fast access to the current cache object, 6, in local cache.

Further features are provided by the method of the present invention in test 234, $|new-old| <= \epsilon+1$, operating in concert with test 256, new>=old+1. According to this test, a cache object in local cache having an OCA of a later version than a received cache object having an earlier version, will not be replaced by the earlier version. The need for such a feature arises from update requests for cache objects received out of the order of changes to the cache objects. In an illustrative example it is assumed old=6, new=2, and $\epsilon=3$. The condition of test 234 as a threshold for test 256 is satisfied, as $|2-6|$ is less than or equal to 3+1 (test 234). But, as 2 is not greater than or equal to 6+1 (test 256), the synchronization request is ignored. Thus out of order message delivery will not leave a client subject to the use of stale cache objects.

In a further feature provided by the method of the present invention, cache objects in local caches will not be replaced by received cache objects having create requests. This feature is implemented in test 234, $|new-old| <= \epsilon+1$, operating in concert with step 252. Similar to the features discussed above, this feature provides that out of order message delivery will not leave a client subject to the use of stale cache objects.

In yet a further feature provided by the method of the present invention, valid cache objects in local caches will not be inadvertently deleted if synchronization requests are received out of order of changes to the cache objects. This feature is implemented by test 234, $|new-old| <= \epsilon+1$, operating as a threshold test for test 262, new>=old. These tests provide that only cache objects having an OCA of a later or equal version can be synchronized, (i.e., deleted); otherwise the synchronization message is ignored.

4. Conclusion

The method of the present invention provides for fast and accurate synchronization of DCMS caches in digital computing networks. The use of synchronization requests containing full object states, as well as the use of OCA and data accuracy comfort factors, combined with decision tables, provides for information management systems in which central databases need not be locked or frozen upon data access. Further, the method of the present invention provides speed advantages as relatively fewer central database queries are needed when cache objects are lost or received out of order of changes to the objects. Further yet, the method of the present invention is generally tolerant of the loss of messages. Moreover, the method eliminates requirements for cache objects received out of order to be locally stored in hard memory, and as such further speed advantages are provided.

Still further advantages, variations, and extensions will be apparent to those of skill in the art within the scope of the invention.

The invention has been explained with reference to specific embodiments. Other embodiments are contemplated without departing from the spirit and scope of the invention. For example, the invention can be used not only with relational databases, but it can also be used with field delimited data, such as spreadsheet databases, hierarchical databases or flat file databases which are field delimited. Further the invention can be used with computer networks that interact with other computer networks, such as local area networks interactive with the Internet or interactive with wide area networks. It is therefore not intended that this invention be limited, except as indicated by the appended claims.

What is claimed is:

1. In an information management system, operative on a plurality of networked computer systems, and having a central database providing storage of a latest confirmed version of data objects and a plurality of distributed cache management systems which can communicate with multiple clients, a method for synchronizing cache objects among caches of said plurality of distributed cache management systems comprising:

providing through the central database an optimistic control attribute for each data object in the central database;

changing, at each local distributed cache management system, each individual cache object when received information impacting the cache object is deemed valid and more current than is contained in a local version of the cache object based on the optimistic control attribute, to establish a changed version of the cache object; and causing to be communicated, from a local distributed cache management system to each other local distributed cache management system, the changed version of the cache object without querying the central database, in response to receiving from the central database a central database write confirmation corresponding to the cache object, wherein the central database need not be locked during the central database write.

2. The method according to claim 1, wherein each said optimistic control attribute is stored at said central database based on an incrementing integer value for each data object and serves as a local object clock for each cache object.

3. The method according to claim 2, wherein said received information includes a full object state and said optimistic control attribute is indicative of a version of said full object state, said local version of the cache object includes a local object clock indicative of a version of said local version of the cache object, wherein a cache synchronization decision table is used to evaluate whether said optimistic control attribute and said local object clock are indicative of whether said full object state is deemed valid and more current than said local object of the cache object.

4. The method according to claim 2, wherein said received information includes:
  a synchronization request to update or change said each individual cache object of said each local distributed cache management system; and
  a full object state and said optimistic control attribute which is indicative of a version of said full object state, said local version of the cache object including a local object clock indicative of a version of said local version of the cache object, wherein a cache synchronization decision table is used to evaluate whether said optimistic control attribute and said local object clock are indicative of whether said full object state is deemed valid and more current than said local object of the cache object.

5. The method according to claim 2, wherein said received information includes:
  a synchronization request to delete said each individual cache object of said each local distributed cache management system, wherein said optimistic control attribute is indicative of a version of a cache object of a sender distributed cache management system, said local version of the cache object including a local object clock indicative of a version of said local version of the cache object, wherein a cache synchronization decision table is used to evaluate whether said optimistic control attribute and said local object clock are indicative of whether said cache object of the sender distributed cache management system is deemed valid and more current than said local object of the cache object.

6. The method of claim 2, wherein a sender distributed cache management system requests synchronization of the central database, and
  if the synchronization request is committed to the central database, then synchronization is requested of said each other local distributed cache management system, or
  if the synchronization request is not committed to the central database, then an error is reported.

7. The method of claim 6, wherein if any of said caches do not contain a selected local cache object and if the received information includes a synchronization request to create or update a selected local cache object, then the caches which do not contain the selected local cache object are synchronized.

8. The method of claim 7 wherein if any of said caches do not contain a version of the selected local cache object and if the received information includes a synchronization request to delete the selected local cache object, then the synchronization request is ignored by the caches which do not contain the selected local cache object.

9. The method according to claim 6, wherein a data accuracy comfort factor represents a threshold between an acceptable cache object and an unacceptable cache object.

10. The method according to claim 9, wherein the unacceptable cache object has an associated optimistic control attribute that is unacceptably different from the local object clock of said each local cache object.

11. The method of claim 10, wherein said synchronization request of said received information is ignored by said caches and said cache objects are invalidated if an absolute value of a difference of said optimistic control attribute of said received information and said local object clock of each said cache object among said caches is greater than said data accuracy comfort factor plus 1.

12. The method of claim 10, wherein said synchronization request of said received information is ignored by said caches if:
  an absolute value of a difference of said optimistic control attribute of said received information and said local object clock of each said cache object is less than or equal to said data accuracy comfort factor plus 1 and said synchronization request of said received information is a create request, or if,
  the absolute value of the difference of said optimistic control attribute of said received information and said local object clock of each said cache object is less than or equal to said data accuracy comfort factor plus 1, and said synchronization request of said received information is an update request, and said optimistic control attribute of said received information is not greater than or equal to said local object clock of each said cache object plus 1, or if,
  the absolute value of the difference of said optimistic control attribute of said received information and said local object clock of each said cache object is less than or equal to said data accuracy comfort factor plus 1, and said synchronization request of said received information is a delete request; and said optimistic control attribute of said received information is not greater than or equal to said local object clock of each said cache object.

13. The method of claim 10, wherein a full object state of said received information is synchronized by said caches if:
  an absolute value of a difference of said optimistic control attribute of said received information and said local object clock of each said cache object is less than or equal to said data accuracy comfort factor plus 1, and said synchronization request of said received information is an update request, and said optimistic control attribute of said received information is greater than or equal to said local object clock of each said cache object plus 1, or if,
  the absolute value of the difference of said optimistic control attribute of said received information and said local object clock of each said cache object is less than or equal to said data accuracy comfort factor plus 1, and said synchronization request of said received information is a delete request, and said optimistic control attribute of said received information is greater than or equal to said local object clock of each said cache object.

14. In an information management system, operative on a plurality of networked computer systems and having a central database providing storage of data objects and a plurality of distributed cache management systems, wherein the central database need not be locked, a method for synchronizing cache objects among caches of said plurality of distributed cache management systems comprising:
  providing the plurality of distributed cache management systems with a hierarchical structure;

processing a client request that either propagates through at least one of the plurality of distributed cache management systems, or the central database, until a response to said client request is issued;

providing, in said central database, storage for a latest confirmed version of each data object;

providing that said central database be unlocked upon data access;

providing through the central database an optimistic control attribute for each data object in the database;

providing that one distributed cache management system of said plurality of distributed cache management systems is at a top of said hierarchical structure and can communicate with multiple clients;

changing at each local distributed cache management system each individual cache object when received information impacting the cache object is deemed valid and more current than is contained in a local version of the cache object based on the optimistic control attribute to create a changed version of the cache object; and causing to be communicated, from a local distributed cache management system to each other local distributed cache management system, the changed version of the cache object without querying the central database, in response to receiving from the central database a central database write confirmation corresponding to the cache object.

15. The method according to claim 14, wherein each said optimistic control attribute is stored at said central database based on an incrementing integer value for each said data object and serves as a local object clock for each said cache object of said plurality of distributed cache management systems.

16. The method according to claim 15, wherein said received information includes a full object state and said optimistic control attribute is indicative of a version of said full object state, said local version of the cache object including a local object clock indicative of a version of said local version of the cache object, wherein a cache synchronization decision table is used to evaluate whether said optimistic control attribute and said local object clock are indicative of whether said full object state is deemed valid and more current than said local version of the cache object.

17. The method of claim 16, wherein said received information further comprises a transactional operation request including at least one of a plurality of requests, said plurality of requests including create, update, and delete requests.

18. The method of claim 17, wherein, if any of said caches do not contain a version of a selected local cache object and if the received information includes a transactional operation request to create or update the selected local cache object, then the caches not containing a version of the selected local cache object are synchronized.

19. The method of claim 17 wherein, if any of said caches do not contain a version of a selected local cache object and if the received information includes a transactional operation request to delete the selected local cache object, then the synchronization request is ignored by the caches not containing the version of the selected local cache object.

20. The method according to claim 17, wherein a data accuracy comfort factor is provided which represents a threshold between acceptable cache objects and unacceptable cache objects, wherein said unacceptable cache objects include said cache objects of said received information having said optimistic control attribute unacceptably different from said local object clock of said local cache object.

21. The method of claim 20, wherein said transactional operation request of said received information is ignored by said caches and said cache objects are invalidated if an absolute value of a difference of said optimistic control attribute of said received information and said local object clock of each said cache object among said caches of said plurality of distributed cache management systems is greater than said data accuracy comfort factor plus 1.

22. The method of claim 21, wherein said transactional operation request of said received information is ignored among said caches of said plurality of said distributed cache management systems if:

the absolute value of the difference of said optimistic control attribute of said received information and said local object clock of each said cache object among said caches is less than or equal to said data accuracy comfort factor plus 1 and said transactional operation request of said received information is a create request, or if the absolute value of the difference of said optimistic control attribute of said received information and said local object clock of each said cache object among said caches is less than or equal to said data accuracy comfort factor plus 1, and said transactional operation request of said received information is an update request, and said optimistic control attribute of said received information is not greater than or equal to said local object clock of each said cache object plus 1, or if, the absolute value of the difference of said optimistic control attribute of said received information and said local object clock of each said cache object is less than or equal to said data accuracy comfort factor plus 1, and said transactional operation request of said received information is a delete request, and said optimistic control attribute of said received information is not greater than or equal to said local object clock of each said cache object.

23. The method of claim 22 wherein said full object state of said received information is synchronized among said caches if:

the absolute value of the difference of said optimistic control attribute of said received information and said local object clock of each said cache object is less than or equal to said data accuracy comfort factor plus 1, and said transactional operation request of said received information is an update request, and said optimistic control attribute of said received information is greater than or equal to said local object clock of each said cache object plus 1, or if, the absolute value of the difference of said optimistic control attribute of said received information and said local object clock of each said cache object is less than or equal to said data accuracy comfort factor plus 1, and said transactional operation request of said received information is a delete request, and said optimistic control attribute of said received information is greater than or equal to said local object clock of each said cache object.

24. A method for synchronizing a transaction in a local cache management system with a central database and a plurality of other distributed cache management systems, the method comprising:

transmitting a transaction request for the transaction from the local cache management system to said central database;

receiving an acknowledgement of a status of the transaction from the central database at the local cache management system, wherein said central database need not be locked during the transaction; and broadcasting the transaction from the local cache management system to said plurality of other distributed cache management systems if said acknowledgement of the status indicates that a central database write of the transaction was successful.

25. The method of claim 24, wherein said broadcasting the transaction includes placing a changed cache object into a data stream via a communications network.

26. The method of claim 25, further comprising:
receiving an optimistic control attribute for the transaction at the local distributed cache management system from the central database; and inserting said optimistic control attribute into said changed cache object before placing it into said data stream.

27. The method of claim 25, further comprising:
receiving the transaction from the local cache management system at one of said plurality of other distributed cache management systems; and making a decision at one of said plurality of other distributed cache management systems as to whether to synchronize the transaction in a local cache, ignore the transaction, or invalidate the transaction.

28. The method of claim 27, wherein said making a decision includes making said decision based upon whether said changed cache object exists in said local cache and based upon an optimistic control attribute in said changed cache object.

29. The method of claim 28, wherein said making said decision is further based on a data accuracy comfort factor.

30. The method of claim 28, wherein said optimistic control attribute acts as a local object clock for said changed cache object.

31. The method of claim 28, wherein said optimistic control attribute is indicative of a version of a full object state for said changed cache object.

32. In an information management system, operative on a plurality of networked computer systems, and having a central database providing storage of a latest confirmed version of data objects and a plurality of distributed cache management systems which can communicate with multiple clients, an apparatus for synchronizing cache objects among caches of said plurality of distributed cache management systems, the apparatus comprising:

means for providing through the central database an optimistic control attribute for each data object in the central database;

means for changing, at each local distributed cache management system, each individual cache object when received information impacting the cache object is deemed valid and more current than is contained in a local version of the cache object based on the optimistic control attribute, to establish a changed version of the cache object; and means for causing to be communicated, from a local distributed cache management system to each other local distributed cache management system, the changed version of the cache object without querying the central database, in response to receiving from the central database a central database write confirmation corresponding to the cache object, wherein the central database need not be locked during the central database write.

33. The apparatus of claim 32, wherein each said optimistic control attribute is stored at said central database based on an incrementing integer value for each data object and serves as a local object clock for each cache object.

34. The apparatus of claim 33, wherein said received information includes a full object state and said optimistic control attribute is indicative of a version of said full object state, said local version of the cache object includes a local object clock indicative of a version of said local version of the cache object, wherein a cache synchronization decision table is used to evaluate whether said optimistic control attribute and said local object clock are indicative of whether said full object state is deemed valid and more current than said local object of the cache object.

35. The apparatus of claim 33, wherein said received information includes:

a synchronization request to update or change said each individual cache object of said each local distributed cache management system; and a full object state and said optimistic control attribute which is indicative of a version of said full object state, said local version of the cache object including a local object clock indicative of a version of said local version of the cache object, wherein a cache synchronization decision table is used to evaluate whether said optimistic control attribute and said local object clock are indicative of whether said full object state is deemed valid and more current than said local object of the cache object.

36. The apparatus of claim 33, wherein said received information includes:

a synchronization request to delete said each individual cache object of said each local distributed cache management system, wherein said optimistic control attribute is indicative of a version of a cache object of a sender distributed cache management system, said local version of the cache object including a local object clock indicative of a version of said local version of the cache object, wherein a cache synchronization decision table is used to evaluate whether said optimistic control attribute and said local object clock are indicative of whether said cache object of the sender distributed cache management system is deemed valid and more current than said local object of the cache object.

37. The apparatus of claim 33, wherein a sender distributed cache management system requests synchronization of the central database, and if the synchronization request is committed to the central database, then synchronization is requested of said each other local distributed cache management system, or if the synchronization request is not committed to the central database, then an error is reported.

38. The apparatus of claim 37, wherein if any of said caches do not contain a selected local cache object and if the received information includes a synchronization request to create or update a selected local cache object, then the caches which do not contain the selected local cache object are synchronized.

39. The apparatus of claim 38 wherein if any of said caches do not contain a version of the selected local cache object and if the received information includes a synchronization request to delete the selected local cache object, then the synchronization request is ignored by the caches which do not contain the selected local cache object.

40. The apparatus of claim 37, wherein a data accuracy comfort factor represents a threshold between an acceptable cache object and an unacceptable cache object.

41. The apparatus of claim 40, wherein the unacceptable cache object has an associated optimistic control attribute that is unacceptably different from the local object clock of said each local cache object.

42. The apparatus of claim 41, wherein said synchronization request of said received information is ignored by said caches and said cache objects are invalidated if an absolute value of a difference of said optimistic control attribute of said received information and said local object clock of each said cache object among said caches is greater than said data accuracy comfort factor plus 1.

43. The apparatus of claim 41, wherein said synchronization request of said received information is ignored by said caches if:
- an absolute value of a difference of said optimistic control attribute of said received information and said local object clock of each said cache object is less than or equal to said data accuracy comfort factor plus 1 and said synchronization request of said received information is a create request, or if,
- the absolute value of the difference of said optimistic control attribute of said received information and said local object clock of each said cache object is less than or equal to said data accuracy comfort factor plus 1, and said synchronization request of said received information is an update request, and said optimistic control attribute of said received information is not greater than or equal to said local object clock of each said cache object plus 1, or if,
- the absolute value of the difference of said optimistic control attribute of said received information and said local object clock of each said cache object is less than or equal to said data accuracy comfort factor plus 1, and said synchronization request of said received information is a delete request; and said optimistic control attribute of said received information is not greater than or equal to said local object clock of each said cache object.

44. The apparatus of claim 41, wherein a full object state of said received information is synchronized by said caches if:
- an absolute value of a difference of said optimistic control attribute of said received information and said local object clock of each said cache object is less than or equal to said data accuracy comfort factor plus 1, and said synchronization request of said received information is an update request, and said optimistic control attribute of said received information is greater than or equal to said local object clock of each said cache object plus 1, or if,
- the absolute value of the difference of said optimistic control attribute of said received information and said local object clock of each said cache object is less than or equal to said data accuracy comfort factor plus 1, and said synchronization request of said received information is a delete request, and said optimistic control attribute of said received information is greater than or equal to said local object clock of each said cache object.

45. In an information management system, operative on a plurality of networked computer systems and having a central database providing storage of data objects and a plurality of distributed cache management systems, wherein the central database need not be locked, an apparatus for synchronizing cache objects among caches of said plurality of distributed cache management systems, the apparatus comprising:
- means for providing the plurality of distributed cache management systems with a hierarchical structure;
- means for processing a client request that either propagates through at least one of the plurality of distributed cache management systems, or the central database, until a response to said client request is issued;
- means for providing, in said central database, storage for a latest confirmed version of each data object;
- means for providing that said central database be unlocked upon data access;
- means for providing through the central database an optimistic control attribute for each data object in the database;
- means for providing that one distributed cache management system of said plurality of distributed cache management systems is at a top of said hierarchical structure and can communicate with multiple clients;
- means for changing at each local distributed cache management system each individual cache object when received information impacting the cache object is deemed valid and more current than is contained in a local version of the cache object based on the optimistic control attribute to create a changed version of the cache object; and
- means for causing to be communicated, from a local distributed cache management system to each other local distributed cache management system, the changed version of the cache object without querying the central database, in response to receiving from the central database a central database write confirmation corresponding to the cache object.

46. The apparatus according to claim 45, wherein each said optimistic control attribute is stored at said central database based on an incrementing integer value for each said data object and serves as a local object clock for each said cache object of said plurality of distributed cache management systems.

47. The apparatus according to claim 46, wherein said received information includes a full object state and said optimistic control attribute is indicative of a version of said full object state, said local version of the cache object including a local object clock indicative of a version of said local version of the cache object, wherein a cache synchronization decision table is used to evaluate whether said optimistic control attribute and said local object clock are indicative of whether said full object state is deemed valid and more current than said local version of the cache object.

48. The apparatus of claim 47, wherein said received information further comprises a transactional operation request including at least one of a plurality of requests, said plurality of requests including create, update, and delete requests.

49. The apparatus of claim 48, wherein, if any of said caches do not contain a version of a selected local cache object and if the received information includes a transactional operation request to create or update the selected local cache object, then the caches not containing a version of the selected local cache object are synchronized.

50. The apparatus of claim 48 wherein, if any of said caches do not contain a version of a selected local cache object and if the received information includes a transactional operation request to delete the selected local cache object, then the synchronization request is ignored by the caches not containing the version of the selected local cache object.

51. The apparatus according to claim 48, wherein a data accuracy comfort factor is provided which represents a threshold between acceptable cache objects and unacceptable cache objects, wherein said unacceptable cache objects include said cache objects of said received information having said optimistic control attribute unacceptably different from said local object clock of said local cache object.

52. The apparatus of claim 51, wherein said transactional operation request of said received information is ignored by said caches and said cache objects are invalidated if an absolute value of a difference of said optimistic control attribute of said received information and said local object clock of each said cache object among said caches of said plurality of distributed cache management systems is greater than said data accuracy comfort factor plus 1.

53. The apparatus of claim 52, wherein said transactional operation request of said received information is ignored among said caches of said plurality of said distributed cache management systems if:

the absolute value of the difference of said optimistic control attribute of said received information and said local object clock of each said cache object among said caches is less than or equal to said data accuracy comfort factor plus 1 and said transactional operation request of said received information is a create request, or if the absolute value of the difference of said optimistic control attribute of said received information and said local object clock of each said cache object among said caches is less than or equal to said data accuracy comfort factor plus 1, and said transactional operation request of said received information is an update request, and said optimistic control attribute of said received information is not greater than or equal to said local object clock of each said cache object plus 1, or if, the absolute value of the difference of said optimistic control attribute of said received information and said local object clock of each said cache object is less than or equal to said data accuracy comfort factor plus 1, and said transactional operation request of said received information is a delete request, and said optimistic control attribute of said received information is not greater than or equal to said local object clock of each said cache object.

54. The apparatus of claim 53 wherein said full object state of said received information is synchronized among said caches if:

the absolute value of the difference of said optimistic control attribute of said received information and said local object clock of each said cache object is less than or equal to said data accuracy comfort factor plus 1, and said transactional operation request of said received information is an update request, and said optimistic control attribute of said received information is greater than or equal to said local object clock of each said cache object plus 1, or if, the absolute value of the difference of said optimistic control attribute of said received information and said local object clock of each said cache object is less than or equal to said data accuracy comfort factor plus 1, and said transactional operation request of said received information is a delete request, and said optimistic control attribute of said received information is greater than or equal to said local object clock of each said cache object.

55. An apparatus for synchronizing a transaction in a local cache management system with a central database and a plurality of other distributed cache management systems, the apparatus comprising:

means for transmitting a transaction request for the transaction from the local cache management system to said central database;

means for receiving an acknowledgement of a status of the transaction from the central database at the local cache management system, wherein said central database need not be locked during the transaction; and means for broadcasting the transaction from the local cache management system to said plurality of other distributed cache management systems if said acknowledgement of the status indicates that a central database write of the transaction was successful.

56. The apparatus of claim 55, wherein said means for broadcasting the transaction includes means for placing a changed cache object into a data stream via a communications network.

57. The apparatus of claim 56, further comprising:

means for receiving an optimistic control attribute for the transaction at the local distributed cache management system from the central database; and means for inserting said optimistic control attribute into said changed cache object before placing it into said data stream.

58. The apparatus of claim 56, further comprising:

means for receiving the transaction from the local cache management system at one of said plurality of other distributed cache management systems; and means for making a decision at one of said plurality of other distributed cache management systems as to whether to synchronize the transaction in a local cache, ignore the transaction, or invalidate the transaction.

59. The apparatus of claim 58, wherein said means for making a decision includes means for making said decision based upon whether said changed cache object exists in said local cache and based upon an optimistic control attribute in said changed cache object.

60. The apparatus of claim 59, wherein said making said decision is further based on a data accuracy comfort factor.

61. The apparatus of claim 59, wherein said optimistic control attribute acts as a local object clock for said changed cache object.

62. The apparatus of claim 59, wherein said optimistic control attribute is indicative of a version of a full object state for said changed cache object.

63. A program storage device readable by a machine, tangibly embodying a program of instructions executable by the machine to perform a method for, in an information management system, operative on a plurality of networked computer systems, and having a central database providing storage of a latest confirmed version of data objects and a plurality of distributed cache management systems which can communicate with multiple clients, synchronizing cache objects among caches of said plurality of distributed cache management systems, the method comprising:

providing through the central database an optimistic control attribute for each data object in the central database;

changing, at each local distributed cache management system, each individual cache object when received information impacting the cache object is deemed valid and more current than is contained in a local version of the cache object based on the optimistic control attribute, to establish a changed version of the cache object; and causing to be communicated, from a local distributed cache management system to each other local distributed cache management system, the changed version of the cache object without querying the central database, in response to receiving from the central database a central database write confirmation corresponding to the cache object, wherein the central database need not be locked during the central database write.

64. A program storage device readable by a machine, tangibly embodying a program of instructions executable by the machine to perform a method for, in an information management system, operative on a plurality of networked computer systems and having a central database providing storage of data objects and a plurality of distributed cache management systems, wherein the central database need not be locked, synchronizing cache objects among caches of said plurality of distributed cache management systems, the method comprising:

providing the plurality of distributed cache management systems with a hierarchical structure;

processing a client request that either propagates through at least one of the plurality of distributed cache management systems, or the central database, until a response to said client request is issued;

providing, in said central database, storage for a latest confirmed version of each data object;

providing that said central database be unlocked upon data access;

providing through the central database an optimistic control attribute for each data object in the database;

providing that one distributed cache management system of said plurality of distributed cache management systems is at a top of said hierarchical structure and can communicate with multiple clients;

changing at each local distributed cache management system each individual cache object when received information impacting the cache object is deemed valid and more current than is contained in a local version of the cache object based on the optimistic control attribute to create a changed version of the cache object; and causing to be communicated, from a local distributed cache management system to each other local distributed cache management system, the changed version of the cache object without querying the central database, in response to receiving from the central database a central database write confirmation corresponding to the cache object.

65. A program storage device readable by a machine, tangibly embodying a program of instructions executable by the machine to perform a method for synchronizing a transaction in a local cache management system with a central database and a plurality of other distributed cache management systems, the method comprising:

transmitting a transaction request for the transaction from the local cache management system to said central database;

receiving an acknowledgement of a status of the transaction from the central database at the local cache management system, wherein said central database need not be locked during the transaction; and broadcasting the transaction from the local cache management system to said plurality of other distributed cache management systems if said acknowledgement of the status indicates that a central database write of the transaction was successful.

* * * * *